(12) United States Patent
Lindskog et al.

(10) Patent No.: US 7,043,456 B2
(45) Date of Patent: May 9, 2006

(54) MOBILE ELECTRONIC TRANSACTION PERSONAL PROXY

(75) Inventors: Helena Lindskog, Karlstad (SE); Mikael Nilsson, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 736 days.

(21) Appl. No.: 09/803,005

(22) Filed: Mar. 8, 2001

(65) Prior Publication Data

US 2001/0056411 A1      Dec. 27, 2001

Related U.S. Application Data

(60) Provisional application No. 60/249,819, filed on Nov. 17, 2000, provisional application No. 60/209,504, filed on Jun. 5, 2000.

(51) Int. Cl.
    *H04L 9/32*      (2006.01)
(52) U.S. Cl. .................. 705/76; 705/29; 713/152; 713/170; 713/192; 370/389; 380/23; 380/30; 455/456.3
(58) Field of Classification Search .......... 705/29, 705/76
    See application file for complete search history.

(56) References Cited

U.S. PATENT DOCUMENTS 5,604,801 A * 2/1997 Dolan et al. ............... 713/159

| | | | |
|---|---|---|---|
| 5,907,681 A | 5/1999 | Bates et al. | 395/200.58 |
| 5,910,989 A * | 6/1999 | Naccache | 713/173 |
| 6,269,445 B1 * | 7/2001 | Nishioka et al. | 713/168 |
| 6,377,810 B1 * | 4/2002 | Geiger et al. | 455/456.2 |
| 6,405,178 B1 * | 6/2002 | Manchala et al. | 705/29 |
| 6,453,416 B1 * | 9/2002 | Epstein | 713/170 |

FOREIGN PATENT DOCUMENTS

| | | |
|---|---|---|
| EP | 0 782 296 A2 * | 12/1996 |
| WO | WO 97/50207 | 12/1997 |
| WO | WO 98/28877 A1 * | 7/1998 |
| WO | WO 98/37661 A1 * | 8/1998 |
| WO | WO 98/57510 A2 * | 12/1998 |

(Continued)

OTHER PUBLICATIONS

Franks et al, "HTTP Authentication: Basic and Digest Access Authentication", RFC-2617, Network Working Group, Jun. 1999.*

(Continued)

*Primary Examiner*—James P. Trammell
*Assistant Examiner*—Daniel L. Greene

(57) ABSTRACT

A method for obtaining a digital signature is disclosed. Upon receipt of request for a digital signature within a customer computer, a Mobile electronic transaction proxy within the customer PC notifies a web browser of the request for the digital signature and assists in obtaining a digital signature on a data string included within the request. After the digital signature is obtained, the data string along with an appended digital signature is transmitted back to a requesting party.

11 Claims, 5 Drawing Sheets

U.S. PATENT DOCUMENTS

| | | | | |
|---|---|---|---|---|
| 6,463,534 B1* | 10/2002 | Geiger et al. | ............... | 713/168 |
| 6,515,988 B1* | 2/2003 | Eldridge et al. | ............ | 370/389 |
| 6,654,754 B1* | 11/2003 | Knauft et al. | ............... | 707/100 |
| 6,694,431 B1* | 2/2004 | Binding et al. | ............ | 713/160 |
| 6,697,944 B1* | 2/2004 | Jones et al. | ................ | 713/168 |
| 6,707,915 B1* | 3/2004 | Jobst et al. | ................ | 380/247 |
| 6,779,115 B1* | 8/2004 | Naim | ........................ | 713/192 |
| 2002/0026584 A1* | 2/2002 | Skubic et al. | ............... | 713/180 |
| 2002/0095583 A1* | 7/2002 | Vanstone et al. | ........... | 713/180 |
| 2002/0116608 A1* | 8/2002 | Wheeler et al. | ............ | 713/155 |
| 2003/0140114 A1* | 7/2003 | Katz et al. | ................. | 709/217 |
| 2003/0172280 A1* | 9/2003 | Scheidt et al. | .............. | 713/182 |

FOREIGN PATENT DOCUMENTS

| | | |
|---|---|---|
| WO | WO 99/33221 | 7/1999 |
| WO | WO 00/54457 A1 * | 9/2000 |
| WO | WO 00/56105 A1 * | 9/2000 |
| WO | 01/06348 | 12/2002 |

OTHER PUBLICATIONS

Anonymous, "Digital ID: Verisign Inc. To Provide Digital IDs for Open Market's Secure Websdrver; Key Technology for Verifying the Identities of Parties in Electronic Commerce", EDGE: Work-Group Computing Report, vol. 6, No. 274, Aug. 21, 1995.*

* cited by examiner

MOBILE ELECTRONIC TRANSACTION PERSONAL PROXY

RELATED APPLICATION(S)

This application claims priority from and incorporates herein by reference the entire disclosure of U.S. Provisional Application Ser. No. 60/249,819, filed Nov. 17, 2000 and U.S. Provisional Application Ser. No. 60/209,504, filed Jun. 5, 2000.

TECHNICAL FIELD

The present invention relates to e-commerce transactions utilizing mobile electronic transaction devices, and more particularly, to a mobile electronic terminal personal proxy for managing a digital signature transaction between a merchant server, a customer PC and a customer mobile electronic terminal.

BACKGROUND OF THE INVENTION

The increased popularity of the Internet has provided expanded opportunities for individuals to purchase items over the Internet by merely using a personal computer, a mobile terminal or combination of both to access online merchants and purchase various types of products. These types of purchases are done in a number of fashions. A customer may utilize their own PC to interconnect with a merchant via the Internet, request a purchase of an item, provide purchase information and have the purchased item shipped to them via services such as UPS or FedEx. Alternatively, electronic commerce items may be purchased wherein the item purchased by the customer is directly downloaded to the customers PC from the merchant.

In addition to purchasing items using a customer's PC, the use of mobile electronic transaction devices (such as mobile telephones, laptop computers, personal digital assistants, etc.), have become popular wherein a customer may purchase an item via the Internet using their mobile electronic transaction device which operates using the wireless application protocol (WAP) or some other type of mobile internet protocol. The mobile electronic terminal may provide functionalities for identifying customer payment information for the merchant and may store receipt information for various purchases made by the customer. Present developments within the electronic commerce shopping area have begun to utilize mobile electronic transaction devices for identification, payment and receipt storage. Many times this may require a merchant computer, customer PC and customer mobile electronic terminal to operate together in order to perform the transaction. Presently, there exists no functionality for controlling a transaction involving each of these three entities.

SUMMARY OF THE INVENTION

The present invention overcomes the foregoing and other problems by providing a mobile electronic transaction (MeT) personal proxy enabling interactions between a customer PC, a merchant server and a mobile electronic terminal to obtain a digital signature in an electronic transaction. Upon receipt of a request for a digital signature during an electronic transaction, the Mobile electronic transaction proxy notifies a web browser of the request for the digital signature. Once the digital signature has been obtained, it is appended to a data string contained within the originally provided request. The web browser is notified that the digital signature has been obtained, and the data with the appended digital signature is transmitted back to the merchant.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
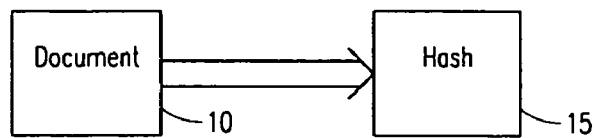
FIG. 1 is a block diagram illustrating the relationship between a document and a hash of a document.

Referring now to the drawings, and more particularly to the FIG. 1, there is illustrated a document 10 and a hash 15 of the document 10. The document 10 would consist of a copy of text which may comprise a contract, letter, sales receipt, or any other item that may need to be signed by a user. The hash 15 contains a listing of information pertaining to the document. This information could include, for example, a document title, a document number/id, an author/name id, and a hash representation which may be numeric, alpha-numeric or symbolic.

Figure 2:
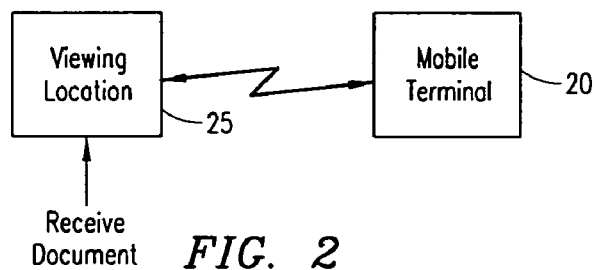
FIG. 2 illustrates the use of a mobile terminal for digitally signing a document in conjunction with a viewing location.

Referring now to FIG. 2, there is illustrated a general representation of the manner for using a personal trusted device such as a mobile terminal 20 to digitally sign a document 10. Alternatively, the personal trusted device could be a laptop computer, personal data assistant, pager or another mobile electronic device. The document 10 is forwarded to some type of viewing location 25 such as a PC, trusted server or other area which will be discussed momentarily. The document 10 is provided to the viewing location 25, where it may be displayed in its entirety by a user wishing to digitally sign the document 10. The hash 15 is created at the viewing location 25 or at a location associated with the viewing location 25 such that the hash 15 may be transmitted to the mobile terminal 20 over a wireless or wireline connection. The user may view the document 10 in its entirety at the viewing location 25 and digitally sign the hash 15 at the mobile terminal 20.

Figure 3:
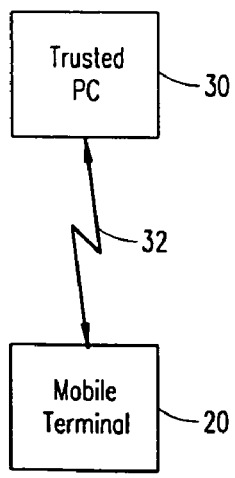
FIG. 3 illustrates a first embodiment wherein the digital signature is provided using the combination of a trusted PC and a mobile terminal.

A first embodiment is illustrated in FIG. 3 where there is illustrated a method for obtaining a digital signature using a trusted PC 30. In this embodiment, the information contained on the trusted PC 30 is assumed to be accurate, including the document 10, and the only thing needed to be protected is the communications channel 32 between the trusted PC 30 and the mobile terminal 20. The communications channel 32 may utilize a serial cable, infrared link or Bluetooth (Bluetooth is a trademark of Telefonaktiebolaget LM Ericsson) pairing for transmitting data. The only requirement for this embodiment is that the trusted PC 30 be authenticated and the integrity of the data be protected over the communications link 32.

Figure 4:
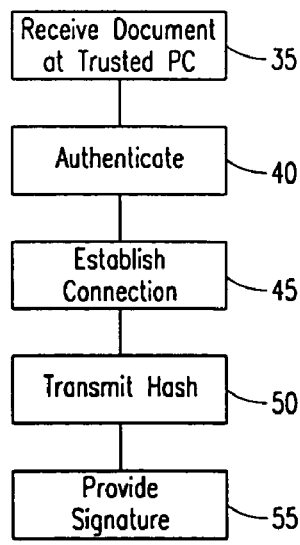
FIG. 4 is a flow diagram illustrating the method of FIG. 3.

Referring now to FIG. 4, the trusted PC 30 receives the document 10 to be digitally signed at step 35. The mobile terminal 20 must authenticate the trusted PC 30 at step 40 to confirm that the mobile terminal 20 is linking with the proper trusted PC 30. After authentication, the communications channel 32 is established at step 45, and the hash 15 of document 10 is transmitted at step 50 to the mobile terminal 20. The user views the entire document 10 at the trusted PC 30 and provides the digital signature at step 55 using the mobile terminal 20. The digital signature may be automatically provided by entering a PIN number at the mobile terminal 20.

Figure 5:
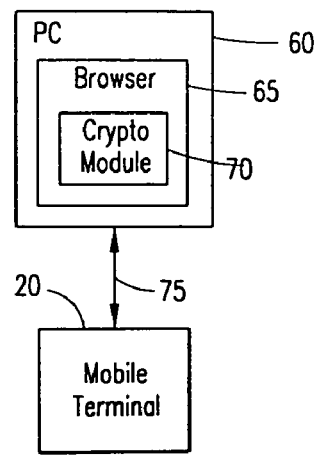
FIG. 5 is an illustration of alternative embodiment wherein a digital signature is obtained using a crypto module and a mobile terminal.
Figure 6:
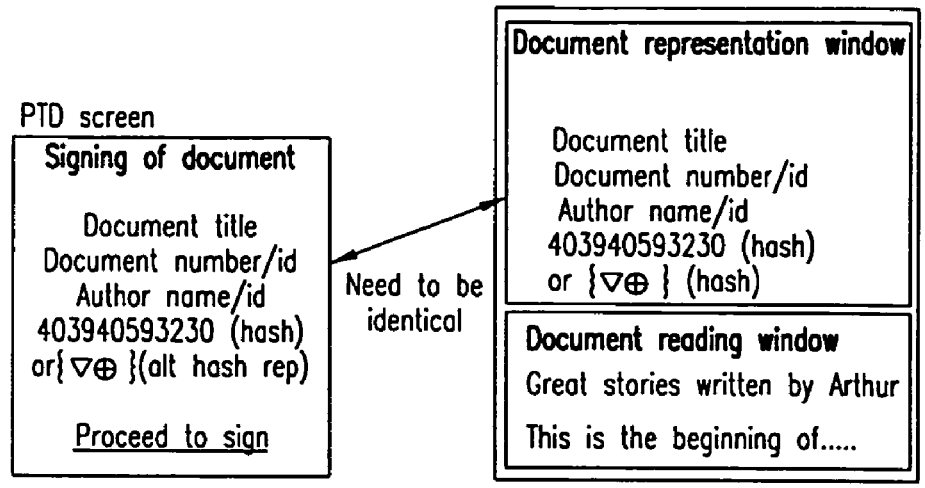
FIG. 6 illustrates the document and hash displays at a PC and a mobile terminal.

A further embodiment, shown in FIG. 5, uses a crypto module 70 which may be implemented in a browser 65 contained within a PC 60. The crypto module 70 is integrated within the browser 65 and implements cryptography such as PKCS#11 and MS CAPI. In order to integrate the crypto module 70 within the browser 65, authenticity and integrity of the crypto module 70 must be verified by the PC operating system or the browser 65 before the module 70 is used. The crypto module 70 displays the document 10 to be signed along with the hash 15 to be transmitted to the mobile terminal 20 as is illustrated in FIG. 6. The mobile terminal 20 may also authenticate and integrity protect the communications channel 75 between the PC 60 and mobile terminal 20 as discussed previously with respect to FIGS. 3 and 4.

Figure 7:
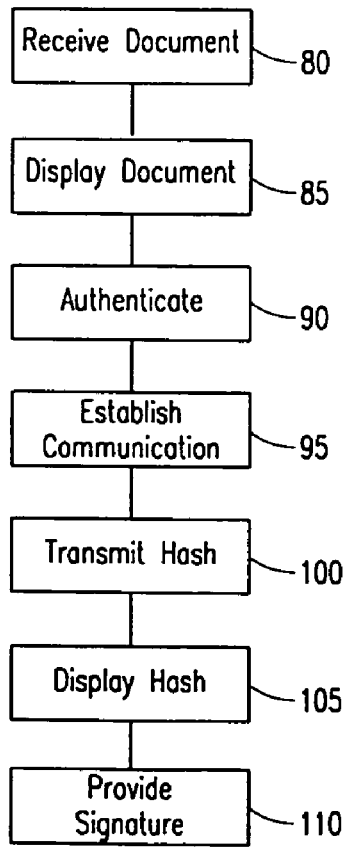
FIG. 7 is a flow diagram illustrating the method of FIG. 5.

Referring now to FIG. 7, there is illustrated a flow diagram of the method for obtaining a digital signature utilizing a crypto module 70. The document 10 to be signed is received at step 80 and displayed by the crypto module 70 using the browser 65 at step 85. The mobile terminal 20 authenticates the PC 60 and crypto module 70 at step 90 and establishes a communications channel 75 at step 95. The hash 15 of the document 10 is transmitted at step 100 to the mobile terminal 20 such that the hash 15 may be displayed at step 105 on a display of the mobile terminal 20. The user views the displayed hash 15 at the mobile terminal and the document 10 displayed at the crypto module 70 and provides at step 110 a digital signature of the document 10.

Figure 8:
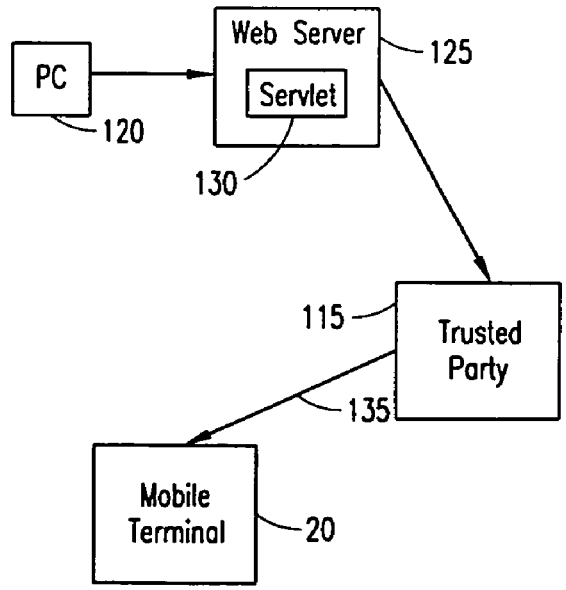
FIG. 8 illustrates a method for obtaining a digital signature between a PC, a trusted party and a mobile terminal.

Referring now to FIG. 8, there is illustrated a further embodiment for obtaining a digital signature of a document 10 wherein a trusted party 115 is used. In this embodiment, after receipt of a document 10, a PC 120 forwards the document through a web server 125 to the trusted party 115. Within the web server 125 a servlet 130 generates a hash 15 that is to be signed by the user at the mobile terminal 20. The hash 15 and document 10 are forwarded from the web server 125 to the trusted party 115, and the hash is forwarded to the mobile terminal 20 via a communications channel 135. The data is transmitted from the PC 120 to the web server 125 and from the web server 125 to the trusted party 115 using SSL/TLS protocol.

Figure 9:
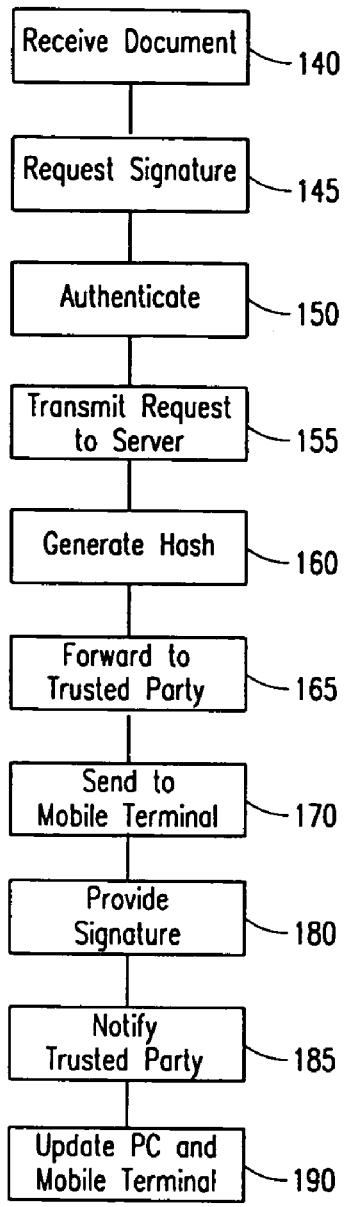
FIG. 9 is a flow diagram illustrating the method of FIG. 8.

Referring now to FIG. 9, there is provided a flow diagram more fully illustrating a method for obtaining a digital signature using a personal trusted device such as a mobile terminal 20 through a trusted party 115. The document 10 to be signed is received at the PC 120 at step 140, and a user requests a digital signature at the PC 120 at step 145. The trusted party 115 authenticates the PC 120 at step 150 before the connection established from the PC 120 to the web server 125 to the trusted party 115. Alternatively, the PC 120 may have been previously securely identified at the trusted party 115 and already have a registered mobile terminal 20 on file with the trusted party 115 for the transaction.

After the PC 120 has been authenticated, the request for a digital signature is transmitted to the web server 125 at step 155 along with the document 10. The servlet 130 generates a hash 15 from the provided document 10. The hash 15 along with the document 10 and the request for the digital signature are forwarded at step 165 to the trusted party 115 from the web server 125. The trusted party 115 sends at step 170 the hash 15 to the mobile terminal 20 over a communications channel 135. After viewing the document at the trusted third party, the mobile terminal provides the digital signature at step 180, and the mobile terminal 20 notifies the trusted party 115 of the signature at step 185. The trusted party validates the provided digital signature and updates and notifies the transaction as being signed at both the PC 120 and mobile terminal 20 at step 190.

Figure 10:
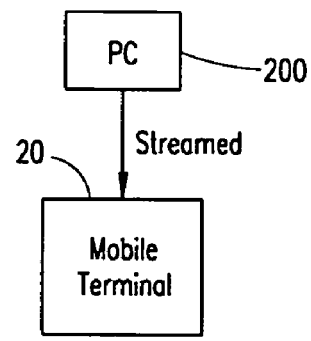
FIG. 10 illustrates the use of streaming data between a PC and a mobile terminal to obtain a digital signature.

Referring now to FIG. 10, there is illustrated yet another embodiment wherein a PC 200 transmits a document 10 to the mobile terminal 20 as streaming data. The general concept behind the use of streaming data is that all or a large portion of the data, not only the hash, shall be transmitted to the mobile terminal 20 for signature generation. The data to be signed is displayed at the PC 200 and is streamed to the mobile terminal 20. The problem still exists that the entire document cannot be displayed to a user on a small screen of the mobile terminal 20, and the internal buffers of the mobile terminal 20 are not normally large enough to store a large document. This requires the use of one of two solutions described in more detail in FIGS. 11 and 12.

Figure 11:
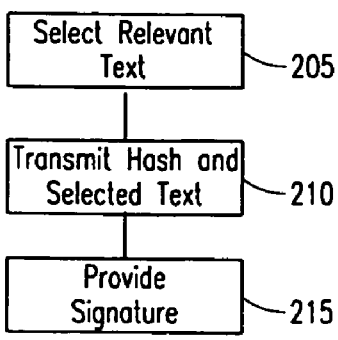
FIG. 11 is a flow diagram illustrating a first method of utilizing streaming data as illustrated in FIG. 10.

Referring now to FIG. 11, there is illustrated a method wherein a user utilizes a mouse at the PC 200 to select relevant text at step 205 that the user considers to be essential. The selected text and the hash 15 are transmitted to the mobile terminal at step 210. The user digitally signs the received information at step 215 after viewing the provided text and the hash 15.

Figure 12:
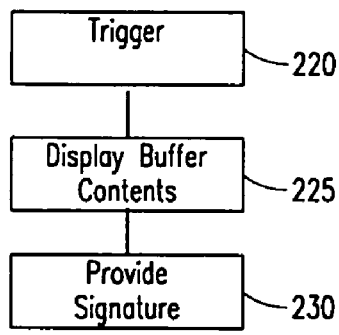
FIG. 12 illustrates a second method for utilizing streaming data as shown in FIG. 10.

Referring now to FIG. 12, there is illustrated an alternative embodiment wherein a user may trigger a button or activation point at step 220 of the mobile terminal 20. Responsive to the trigger, the mobile terminal 20 displays the present content of its buffers at step 225. The user may then digitally sign a document at step 230 based upon what is viewed.

Despite being unable to display or even store a large document 10, the mobile terminal 20 may be able to receive the text of the document 10 from the PC and compute the hash 15 from the received text. The hash 15 computed in the mobile terminal 20 can then be compared in the mobile terminal 20 with the hash 15 transmitted by the PC which the user is being invited to sign. Other checks such as byte count can also be computed in the mobile terminal 20 to verify that the document 10 to which the hash code 15 applies is the claimed document 10. It would be preferable to include the document byte count as part of the bytestring over which the hash code 15 is computed. The above steps provide additional security safeguards to the user that he is signing what he thinks he is signing.

Figure 13:
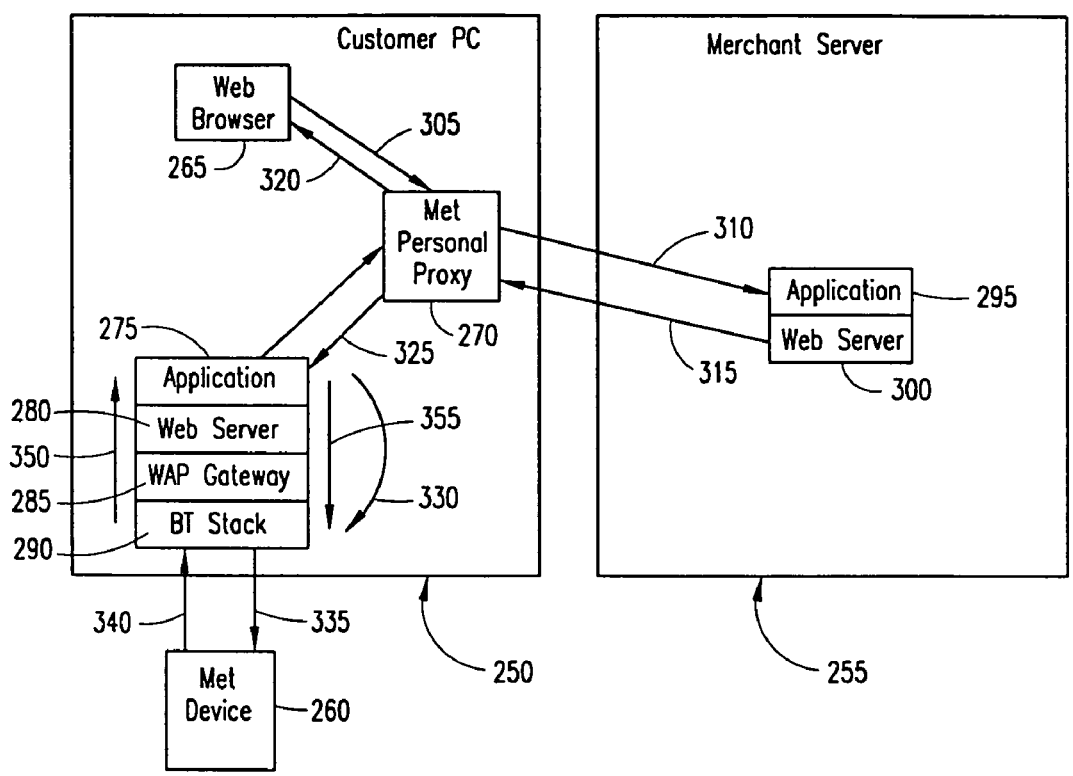
FIG. 13 is a block diagram of a further embodiment including a customer PC, merchant server and customer mobile terminal and the interactions therebetween.

Referring now to FIG. 13, there is illustrated an alternative embodiment for providing a digital signature including a customer PC 250, a merchant server 255 and a customer mobile electronic transaction (MeT) device 260. The customer PC 250 includes a web browser 265 enabling the user to access the merchant server 255 via a network such as the Internet. The customer PC 250 further includes a mobile electronic terminal personal proxy (MPP) 270 for controlling electronic commerce transactions between the customer PC 250, the merchant server 255 and the customer Mobile electronic transaction device 260. The MPP 270 is accessed via the web browser 265. The MPP 270 comprises a software module that is executable by the customer PC 250. Communications between the browser 265 and MPP 270 and between the MPP 270 and the merchant server 255 use HTTP protocol (extended to handle the Mobile electronic transaction specific header information) over TCP/IP. The MPP 270 enables the customer PC 250 to act as a server for a Mobile electronic transaction device 260. Access to the Mobile electronic transaction device 260 will only require user provided authentication (password, PIN) when payment is requested.

An application 275 within the customer PC provides any of a number of functionalities with respect to an electronic commerce transaction. With respect to the following description of the method of the present invention, the application 275 will provide a digital signature functionality wherein a data string provided from the merchant server 255 may have a digital signal appended thereto by the application 275.

The web server 280 provides the ability for the mobile terminal to connect to services in the PC 250. The WAP gateway 285 provides for the ability of a wireless device such as the Mobile electronic transaction device 260 to access the Internet using the WAP protocol through the customer PC 250. The WAP gateway 285 acts as an interface between a WAP network and a TCP/IP network such as the Internet. The WAP gateway 285 converts between the WAP and TCP/IP protocols.

The Bluetooth stack 290 enables the customer PC 250 to generate a short range wireless link with the Mobile electronic transaction device 260 within a limited, defined area using the Bluetooth protocol. While the present invention is described with the use of a short range wireless link using the Bluetooth protocol, it should be realized that any other short range wireless protocol enabling the customer PC 250 to access a closely located Mobile electronic transaction device 260 or other information devices would be useful within the context of the present invention.

The mobile electronic transaction device 260 may consist of a mobile telephone, laptop computer, personal data assistant, or any other similarly configured mobile electronic device which contains information necessary to complete an electronic commerce transaction. The merchant server 255 includes applications 295 for performing necessary functionalities for completing an electronic commerce transaction with the customer PC 250 and a web server 300 enabling the merchant server to obtain access to a network such as the Internet.

Figure 14:
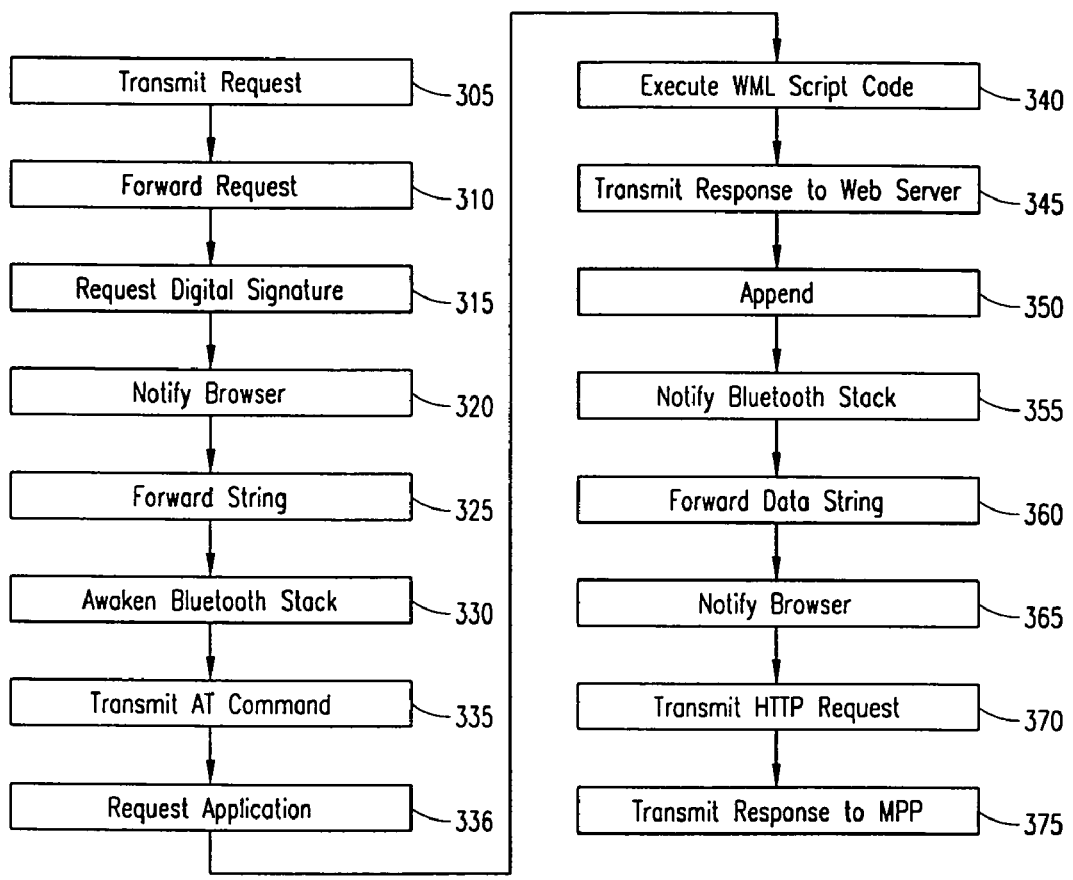
FIG. 14 is a flow diagram illustrating the method of the system illustrated in FIG. 13.

Referring now also to FIG. 14, there is illustrated a flow diagram illustrating the manner in which the MPP 270 controls a request for performance of a digital signature between a customer PC 250, merchant server 255 and Mobile electronic transaction device 260. At step 305, a request is transmitted from the web browser 265 to the MPP 270. The MPP 270 forwards the request to the web server 300 of the merchant server 255 at step 310. The request may comprise a request to purchase a particular item or to download already purchased products.

In order to process the request, the merchant server 255 requires a digital signature from the customer. The merchant server 255 responds to the request by transmitting at step 315 a response that includes a specific data string and a request for digital signature to be attached to the data string. The merchant response to the request from the MPP 270 comprises a URI containing a specific HTTP 1.1 header: for example: [Mobile electronic transaction-sign: "http://merchantsite.com/responsesite/", "String to sign"]. This comprises an instruction for the Mobile electronic transaction device 260 to sign the attached data string and transmit the digitally signed data string back to the indicated HTTP site. The MPP 270 will pass most requests or responses through without taking action. However, once a Mobile electronic transaction command is detected within a request or response the MPP 270 is actuated. The MPP 270 recognizes the Mobile electronic transaction command included in the HTTP header and transmits at step 320 a notification to the browser 265 indicating a digital signature has been requested. It should be realized that Mobile electronic transaction commands other than a request for a digital signal may also be utilized. The web browser 265 will display a page having a PRAGMA REFRESH (fetch from server when reloaded, i.e., do not cache) header command while the digital signature is obtained.

The data string within the response from the merchant server 255 is forwarded at step 325 to the application 275 within the customer's PC 250. Responsive to the received data string, the application 275 transmits at step 330 a command to the Bluetooth stack 290. The command instructs the Bluetooth stack 290 to awaken the Mobile electronic transaction device 260, if possible. The awakening is accomplished by transmitting an AT command to the Mobile electronic transaction device 260 using Bluetooth at step 335. Responsive to this awakening, the Mobile electronic transaction device 260 will request at step 336 the same application of the Mobile electronic transaction device 260. The application within the Mobile electronic transaction device 260 executes at step 340 a WML script code that will provide a request containing the digital signature (response). At step 345 the response including the digital signature is transmitted to the web server 280 via the Bluetooth stack 290 and WAP Gateway 285. The response is then passed to the application 275. The application 275 appends the digital signature to the provided data string at step 350 and notifies the Bluetooth stack 290 of the completed signature at step 355.

The application 275 forwards at step 360 the digitally signed data string back to the MPP 270. The MPP 270 notifies the browser at step 365 of the completed signing of the data string which then begins reloading a URI displaying an indication that the data string has been signed. The MPP transmits at step 370 an HTTP request to the URL contained in the original HTTP header (http://merchantsite.com/responsesite/) containing the signed data string. Upon receipt of the signed data string the web server 300 within the merchant server 255 transmits a response back to the MPP at step 375 notifying the web browser 265 of the customer PC that the transaction is completed.

The previous description is of a preferred embodiment for implementing the invention, and the scope of the invention should not necessarily be limited by this description. The scope of the present invention is instead defined by the following claims.

What is claimed is:

1. A method for obtaining a digital signature comprising the steps of:
   transmitting a merchant request from a web browser to a merchant server;
   responding to the merchant request with a specific data string having a header, wherein the header includes a request for a digital signature to be appended to the data string;
   receiving the request for the digital signature;
   notifying the web browser of the request for the digital signature;
   obtaining the digital signature from a wireless device;
   appending the digital signature to the specific data string;
   notifying the web browser the digital signature has been obtained;
   transmitting the data with the appended digital signature to a requesting party;
   establishing a protected short range wireless link between a computer and the wireless device; and
   transmitting, via the short range wireless link, the digital signature from the wireless device to the computer.

2. The method of claim 1, wherein the step of obtaining further includes the step of:
   forwarding the data to an application within the computer.

3. The method of claim 1, further including the step of recognizing a command within the request for a digital signature.

4. The method of claim 1, further including the step of including a command for the digital signature and the data to be digitally signed within an HTTP header transmitted to a customer.

5. The method of claim 1, wherein the step of transmitting the data with the appended digital signature further includes transmitting the data with the appended digital signature to a URL included within the request.

6. The method of claim 1, wherein the step of notifying further includes the step of periodically reloading a web page notifying the customer of the request for the digital signature.

7. A method for obtaining a digital signature in a transaction between a computer of a customer and a merchant, comprising the steps of:
   receiving a request for a digital signature to be appended to a specific data string from the merchant during an electronic transaction;
   recognizing a command for the digital signature and the data string to be digitally signed within the request, the command being contained within a header of the data string;
   notifying a web browser of the request for the digital signature;
   forwarding the data string to an application within the computer;
   establishing a short range wireless link between the computer and a wireless device;
   forwarding the digital signature to the computer from the wireless device via the short range wireless link;
   appending the digital signature to the data string;
   notifying the web browser the digital signature has been obtained; and
   transmitting the data string with the appended digital signature to a URL included within the request.

8. The method of claim 7, further including the step of including the command for the digital signature and the data string to be digitally signed within an HTTP header transmitted to the computer of the customer by the merchant.

9. The method of claim 7, wherein the step of notifying further includes the step of periodically reloading a web page notifying the customer of the request for the digital signature.

10. A mobile electronic transaction personal proxy device, comprising:
    a first interface with a merchant computer;
    a second interface with a web browser;
    a third interface with a Mobile electronic transaction device; and
    control logic configured to:
       receive a specific data string from the merchant computer, the specific data string having a header;
       notify the web browser of a request for a digital signature to be appended to a specific data string from the merchant computer, wherein the request is contained within the header;
       request the specific data string be digitally signed by the Mobile electronic transaction device;
       receive a digitally signed data string from the Mobile electronic transaction device;
       notify the web browser of the digitally signed data string; and
       forward, via an established protected short range wireless connection, the digitally signed data string from the mobile electronic transaction device.

11. The method of claim 1, wherein in response to the request for the digital signature being received from the merchant server, the obtaining of the digital signature is performed without additional interaction from the merchant server.

* * * * *